(12) United States Patent
Visoz et al.

(10) Patent No.: US 12,308,937 B2
(45) Date of Patent: May 20, 2025

(54) OMAMRC METHOD AND SYSTEM WITH FDM TRANSMISSION

(71) Applicant: ORANGE, Issy-les-Moulineaux (FR)

(72) Inventors: Raphaël Visoz, Chatillon (FR); Ali Al Khansa, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 331 days.

(21) Appl. No.: 18/002,736

(22) PCT Filed: Jun. 18, 2021

(86) PCT No.: PCT/FR2021/051114
§ 371 (c)(1),
(2) Date: Dec. 21, 2022

(87) PCT Pub. No.: WO2021/260308
PCT Pub. Date: Dec. 30, 2021

(65) Prior Publication Data
US 2023/0246704 A1 Aug. 3, 2023

(30) Foreign Application Priority Data
Jun. 24, 2020 (FR) ..................................... 2006623

(51) Int. Cl.
*H04B 7/155* (2006.01)
*H04L 1/00* (2006.01)

(52) U.S. Cl.
CPC ..... *H04B 7/15592* (2013.01); *H04B 7/15521* (2013.01); *H04L 1/0009* (2013.01); *H04L 1/0077* (2013.01)

(58) Field of Classification Search
CPC ............ H04B 7/15592; H04B 7/15521; H04L 1/0009; H04L 1/0077; H04L 1/0003; H04L 1/18; H04L 2001/0097
See application file for complete search history.

(56) References Cited

U.S. PATENT DOCUMENTS

| | | | |
|---|---|---|---|
| 11,368,261 B2* | 6/2022 | Cerovic | ................ H04B 7/155 |
| 11,411,680 B2 | 8/2022 | Cerovic | |
| 11,418,252 B2* | 8/2022 | Cerovic | ................ H04L 1/1864 |

FOREIGN PATENT DOCUMENTS

| | | | |
|---|---|---|---|
| FR | 3067543 A1 | 12/2018 | |
| FR | 3078459 A1 | 8/2019 | |

(Continued)

OTHER PUBLICATIONS

International Search Report dated Sep. 20, 2021 for corresponding International Application No. PCT/FR2021/051114, filed Jun. 18, 2021.

(Continued)

*Primary Examiner* — Hashim S Bhatti
(74) *Attorney, Agent, or Firm* — David D. Brush; Westman, Champlin & Koehler, P.A.

(57) ABSTRACT

A message method intended for an OMAMRC telecommunication system with M sources $s_i$ i∈{1, . . . , M], potentially L relays ($r_1$ . . . , $r_L$) and a destination. The transmission is of FDM type in a band divided into B mutually orthogonal sub-bands. The method includes: a simultaneous transmission of the M sources in a time interval with allocation of at least one sub-band per source and at least one cooperative retransmission for a time interval of at least one relay node taken from among the M sources and the L relays which is selected using a selection strategy with allocation of at least one sub-band per node selected.

8 Claims, 1 Drawing Sheet

(56) References Cited

FOREIGN PATENT DOCUMENTS

FR           3079378 A1    9/2019
WO        2019162592 A1    8/2019

OTHER PUBLICATIONS

Written Opinion of the International Searching Authority dated Sep. 20, 2021 for corresponding International Application No. PCT/FR2021/051114, filed Jun. 18, 2021.
English translation of the Written Opinion of the International Searching Authority dated Sep. 30, 2021 for corresponding International Application No. PCT/FR2021/051114, filed Jun. 18, 2021.
Cerovic Stefan et al., "Centralized Scheduling Strategies for Cooperative HARQ Retransmissions in Multi-Source Multi-Relay Wireless Networks", 2018 IEEE International Conference on Communications (ICC), IEEE, May 20, 2018 (May 20, 2018), p. 1-6, XP033378563.

* cited by examiner

OMAMRC METHOD AND SYSTEM WITH FDM TRANSMISSION

CROSS-REFERENCE TO RELATED APPLICATIONS

This Application is a Section 371 National Stage Application of International Application No. PCT/FR2021/051114, filed Jun. 18, 2021, which is incorporated herein by reference in its entirety and published as WO 2021/260308 A1 on Dec. 30, 2021, not in English.

FIELD OF THE INVENTION

The present invention relates to the field of digital communications. Within this field, the invention more specifically relates to the transmission of coded data between at least two sources and a destination with relaying by at least two nodes that can be relays or sources. It is understood that a relay does not have a message to be transmitted. A relay is a node dedicated to relaying messages from the sources, while a source has its own message to be transmitted and in some cases can also relay the messages from the other sources, i.e., the source is said to be cooperative in this case.

Numerous relaying techniques exist that are known as: "amplify and forward", "decode and forward", "compress-and-forward", "non-orthogonal amplify and forward", "dynamic decode and forward", etc.

The invention particularly, but not exclusively, applies to the transmission of data via mobile networks, for example, for real-time applications, or via sensor networks, for example.

Such a network of sensors is a multi-user network, made up of a plurality of sources, a plurality of relays and a recipient using a time orthogonal multiple-access scheme of the transmission channel between the relays and the destination, denoted OMAMRC ("Orthogonal Multiple-Access Multiple-Relay Channel").

PRIOR ART

An OMAMRC transmission system implementing slow link adaptation is known from application WO 2019/162592 published on 29 Aug. 2019. The described OMAMRC telecommunication system has M sources, optionally L relays and a destination, $M \geq 2$, $L \geq 0$, and it uses a time orthogonal multiple-access scheme of the transmission channel that is applied between the nodes taken from among the M sources and the L relays.

The maximum number of time slots per transmitted frame is $M + T_{max}$, with M slots allocated during a first phase to the successive transmissions of the M sources and $T_{used} \leq T_{max}$ slots for one or more cooperative retransmission(s) allocated during a second phase to one or more node(s) selected by the destination in accordance with a selection strategy.

The considered OMAMRC transmission system comprises at least two sources, with each of these sources being able to operate at different instants either as a source or as a relay node. The system optionally can further comprise relays. The term 'node' equally covers a relay and a source acting as a relay node or as a source. The considered system is such that the sources themselves can be relays. A relay differs from a source since it does not have a message to be transmitted that is specific thereto, i.e., it only retransmits messages originating from other nodes. The relay always performs a cooperative retransmission.

The links between the various nodes of the system are subject to slow fading and to Gaussian white noise. Knowledge of all the links of the system (CSI "Channel State Information") by the destination is not available. Indeed, the links between the sources, between the relays, between the relays and the sources are not directly observable by the destination and their knowledge by the destination would require an excessive exchange of information between the sources, the relays and the destination. In order to limit the feedback overhead, only information relating to the distribution/statistic of the channels (CDI "Channel Distribution Information") of all the links, for example, average quality (for example, average SNR, average SINR) of all the links, is assumed to be known by the destination for the purpose of determining the rates allocated to the sources.

The link adaptation is of the slow type, i.e., before any transmission, the destination allocates initial rates to the sources knowing the distribution of all the channels (CDI "Channel Distribution Information"). In general, it is possible to feed back to the CDI distribution based on knowledge of the SNR or average SINR of each link of the system.

The transmissions of the messages from the sources are divided into frames, during which the CSIs of the links are assumed to be constant (slow fading hypothesis). The rate allocation is assumed to not change for several hundred frames, it only changes with any changes in the CDI. The method distinguishes three phases, an initial phase and, for each frame to be transmitted, a $1^{st}$ phase and a $2^{nd}$ phase. A frame is transmitted in two phases, which are optionally preceded by an additional phase, called initial phase.

During the initialization phase, the destination determines an initial rate for each source by taking into account the average quality (for example, SNR) of each of the links of the system. The destination estimates the quality (for example, SNR) of the direct links: source to destination and relay to destination, in accordance with known techniques based on the exploitation of reference signals. The quality of the source-source, relay-relay and source-relay links is estimated by the sources and the relays by exploiting the reference signals, for example. The sources and the relays transmit the average qualities of the links to the destination. This transmission occurs before the initialization phase. Since only the average value of the quality of a link is taken into account, it is refreshed over a long time scale, i.e., over a time that allows the fast variations (fast fading) of the channel to be averaged. This time is of the order of the time required to cover several tens of wavelengths of the frequency of the transmitted signal for a given speed. The initialization phase occurs, for example, every 200 to 1,000 frames. The destination feeds back the initial rates that it has determined to the sources via a return channel. The initial rates remain constant between two occurrences of the initialization phase.

During the first phase, the M sources successively transmit their message during the M time slots, respectively using modulation and coding schemes determined from the initial rates.

During this phase, the number $N_1$ of channel uses (channel use, i.e., resource element according to 3GPP terminology) is fixed and identical for each of the sources.

During the $2^{nd}$ phase, the messages from the sources are cooperatively retransmitted by the relays and/or by the sources. This phase lasts for the maximum $T_{max}$ of time slots. During this phase, the number $N_2$ of channel uses is fixed and identical for each of the sources.

During the first phase, the mutually independent sources broadcast their sequences of information that are coded in the form of messages for the attention of a single recipient. Each source broadcasts its messages with the initial rate. The destination sends its initial rate to each source via control channels with a very limited flow rate. Thus, during the first phase, the sources in turn each transmit their respective message during time slots that are each dedicated to a source.

The sources other than that which transmits, and optionally the relays, of the "Half Duplex" type, receive the successive messages from the sources, decode them and, if they are selected, generate a message only based on the messages of the sources decoded without error.

The selected nodes then mutually access the channel in a time orthogonal manner during the second phase in order to retransmit their generated message to the destination.

The destination can select which node must retransmit at a given instant.

The method implements a strategy in order to maximize the average spectral efficiency (utility metric) within the considered system subject to compliance with an individual quality of service (QoS) per source, i.e., an average individual BLER per source:

$$\eta^{sla} = \sum_{i=1}^{M} \frac{R_i}{M + \alpha \mathbb{E}(T_{used})}(1 - BLER_i),$$

where:
$R_i = K_i/N_1$ represents the initial rate of the source i, with $K_i$ being the number of information bits of the message from the source $i \in \{1, \ldots, M\}$. $R_i$ is a variable that assumes discrete values taken in a finite set $\{\overline{R}_1, \ldots, \overline{R}_{n_{MCS}}\}$ with $n_{MCS}$ being the number of rates corresponding to the various modulation and coding schemes (MCS) available for the transmission;

$T_{used} \leq T_{max}$ presents the number of cooperative retransmissions used during the $2^{nd}$ phase, $\mathbb{E}(T_{used})$ is the average of the number of cooperative retransmissions used during the second phase;

$\alpha = N_2/N_1$ is the ratio between the number of channel uses during the second phase and the number of channel uses during the first phase;

$BLER_i$ represents the block error rate for the source i. $BLER_i$ denotes the multivariable function $BLER_i$ ($R_1, \ldots, R_M$) that depends on the current value assumed by the rate variables $R_1, \ldots, R_M$.

The QoS constraint on the individual BLER provided per source is expressed as: $BLER_i \leq BLER_{QoS,i}$, $\forall i \in \{1, \ldots, M\}$. An algorithm based on an interference-free or "Genie Aided" approach is used to solve the problem of optimizing multi-dimensional rate allocation. This approach involves independently determining each initial rate of a source by assuming that all the messages of the other sources are known to the destination and the relays and then iteratively determining the rates by initializing their value with the values determined in accordance with the "Genie Aided" approach. The utility metric that involves a spectral efficiency is dependent on the strategy for selecting nodes that occurs during the second phase.

Main Features of the Invention

The subject matter of the present invention is a method for transmitting messages intended for an OMAMRC telecommunication system with M sources $s_i$, $i \in \{1, \ldots, M\}$, optionally L relays $r_1, \ldots, r_L$ and a destination, $M \geq 2$, $L \geq 0$, $M \leq B$. The transmission is of the FDM type on a band divided into B mutually orthogonal sub-bands. The method is such that it comprises:

simultaneous transmission of the M sources during a time slot with allocation of at least one sub-band per source; and at least one cooperative retransmission during a time slot of at least one relay node taken from among the M sources and the L relays selected in accordance with a selection strategy with allocation of at least one sub-band per selected node, in order to maximize a quality of service metric.

Allocating sub-bands between the sources allows the time required to transmit data to be reduced since the sources simultaneously transmit in the same first time slot. Such a method is therefore well suited for services that are demanding in terms of latency. The allocation of one or more sub-band(s) per source, as well as the strategy for selecting the sources during the next slots, are carried out in order to maximize a quality of service metric, for example, a BLER, a spectral efficiency. Maximizing the quality of service allows the rate to be optimized or the transmission power of the sources to be reduced for the same rate.

The one or more slot(s) following the first time slot are dedicated to retransmissions including at least one cooperative retransmission. A cooperative retransmission is either a transmission by a relay or a transmission by a source capable of assisting the destination with decoding at least one other source. Hereafter, a non-cooperative retransmission will be referred to as a retransmission by the source of its own message. A cooperative retransmission is a transmission by a node that contains information relating to at least one message from another node. The transmission of a relay is, by nature, a cooperative retransmission, but also the transmission of a source (which is capable of cooperation), which includes information relating to at least one message from another source in its transmission. The cooperation of the relay nodes ensures that the reliability of the transmissions increases.

According to one embodiment, the selection strategy is such that a relay node that decodes a set of sources at a time slot t can only cooperate at a time slot t+1 for a single source of its set. This embodiment allows a direct expression to be obtained of the individual cutoff event of a source, i.e., without having to obtain the cutoff events of all the subgroups of the sources containing the considered source. The selection of the source, from among the sources not yet decoded without error by the destination, with which the node cooperates can be random, the transmission of the node to the destination therefore comprises the indication of the source with which it cooperates. Furthermore, the common cutoff event of a set of sources is obtained simply as being the joining of the individual cutoffs of the sources of the set.

According to one embodiment, the method is such that:
the destination broadcasts its set of correctly decoded sources from among the received sources to the relay nodes during a transmission slot;
the relay nodes that have correctly decoded a source not correctly decoded by the destination notify the destination as such;
the destination broadcasts a vector $a_t$ to the relay nodes comprising the relay nodes selected for the sub-bands for cooperative or non-cooperative retransmission during the next transmission slot.

According to this protocol, the destination feeds back its set of correctly decoded sources to the relay nodes on completion of the reception of data transmitted during a transmission slot. This feedback can occur via a control channel. According to a particularly simple embodiment, the destination feeds back M bits, which indicate, for each of the M sources, whether or not it is correctly decoded. If all the sources are correctly decoded by the destination, i.e., its set of correctly decoded sources contains the M sources, a new frame is transmitted.

According to one embodiment, a relay node notifies the destination by transmitting a single bit in a control channel.

According to this embodiment, signaling the relay nodes to the destination is minimal and therefore has the advantage of consuming hardly any channel resources. With this information, the destination can implement a selection strategy, which, for example, involves maximizing, at a given time slot t, the sum of the mutual information between the nodes that can assist with their allocated sub-bands and the destination: $\hat{a}_t = \text{argmax}_{a_t \in Z_t} \{\sum_{i=1}^{M+L} I_{t,i}\}$.

According to one embodiment, a relay node notifies the destination by transmitting its set of correctly decoded sources.

Compared to the previous embodiment, signaling the relay nodes to the destination according to the latter embodiment consumes more channel resources. However, the transmitted information allows the destination to more efficiently select the relay nodes to assist it in decoding a maximum number of sources.

According to one embodiment, the destination selects the relay nodes allowing it to correctly decode as many sources as possible on completion of the cooperative or non-cooperative retransmission.

According to this embodiment, the destination feeds back a vector to the relay nodes, in which vector the relay nodes that maximize the number of sources correctly decoded by these relay nodes and not yet correctly decoded by the destination are selected. The vector further comprises the allocation of the sub-bands to the selected relay nodes.

According to one embodiment, the destination selects the relay nodes such that the sum of the mutual information between the nodes that can assist with their allocated sub-bands and the destination is maximized.

In the case where several vectors $a_t$ can lead to the same maximum number of newly decoded sources, the method selects the vector $\hat{a}_t$ that maximizes the sum $\sum_{i=1}^{M+L} I_{t,i}$ of the mutual information between the nodes that can assist with their associated sub-bands and the destination: $\hat{a}_t = \text{argmax}_{a_t \in A_t} \{\sum_{i=1}^{M+L} I_{t,i}\}$.

According to one embodiment, the method has slow link adaptation and is such that the rates allocated to the sources are determined in order to maximize a metric expressed in the form of an average utility function subject to an average individual BLER for each source:

$$\eta^{sla} = \frac{1}{B} \sum_{i=1}^{M} \frac{R_i n_{0,i}}{1 + \mathbb{E}(T_{used})} (1 - BLER_i),$$

with:

$$R_i = \frac{K_i}{n_{0,i} \times F}$$

being a variable representing the initial rate allocated to the source i, $i \in \{1, \ldots, M\}$;
$K_i$ being the amount of data transmitted on $n_{0,i} \times F$ channel uses by the source i;

$T_{used}$ being the number of time slots used for cooperative/optionally non-cooperative retransmissions;
$\mathbb{E}(T_{used})$ being an average of the number of time slots used for the cooperative/optionally non-cooperative retransmissions;
$BLER_i$ being the block error rate for the source i.

According to one embodiment, the method has fast link adaptation and is such that the rates allocated to the sources are determined in order to maximize a metric expressed in the form of an average utility function subject to the individual cutoffs of the sources:

$$\eta^{fla} = \frac{1}{B} \sum_{i=1}^{M} \frac{R_i n_{0,i}}{1 + T_{used}} (1 - \mathcal{O}_{i,T_{used}}),$$

with:

$\mathcal{O}_{i,t}$ being the probability of individual cutoff of the source i at the slot t of cooperative/optionally non-cooperative retransmission;
$T_{used}$ being the number of time slots used for the cooperative/optionally non-cooperative retransmissions;

$$R_i = \frac{K_i}{n_{0,i} \times F}$$

being a variable representing the initial rate allocated to the source i, $i \in \{1, \ldots, M\}$.

A further aim of the invention is a system comprising M sources $s_1, \ldots, s_M$, L relays $r_1, \ldots, r_L$ and a destination d, $M \geq 2$, $L \geq 0$, for implementation of a transmission method according to the invention.

A further aim of the invention is each of the specific software applications on one or more information media, with said applications comprising program instructions adapted for implementing the transmission method when these applications are executed by processors.

A further aim of the invention is configured memories comprising instruction codes respectively corresponding to each of the specific applications.

The memory can be incorporated into any entity or device capable of storing the program. The memory can be of the ROM type, for example, a CD ROM or a microelectronic circuit ROM, or even of the magnetic type, for example, a USB key or a hard disk.

Moreover, each specific application according to the invention can be downloaded from a server accessible on an Internet type network.

The optional features set forth above within the scope of the transmission method can optionally apply to the software application and to the aforementioned memory.

LIST OF FIGURES

Further features and advantages of the invention will become more clearly apparent from reading the following description of embodiments, which are provided by way of simple illustrative and non-limiting examples, and the appended drawings, in which.

DESCRIPTION OF SPECIFIC EMBODIMENTS

A channel use is the smallest time-frequency resource grading defined by the system that allows a modulated symbol to be transmitted. The number of channel uses is linked to the available frequency band and to the transmission duration.

Figure 1:
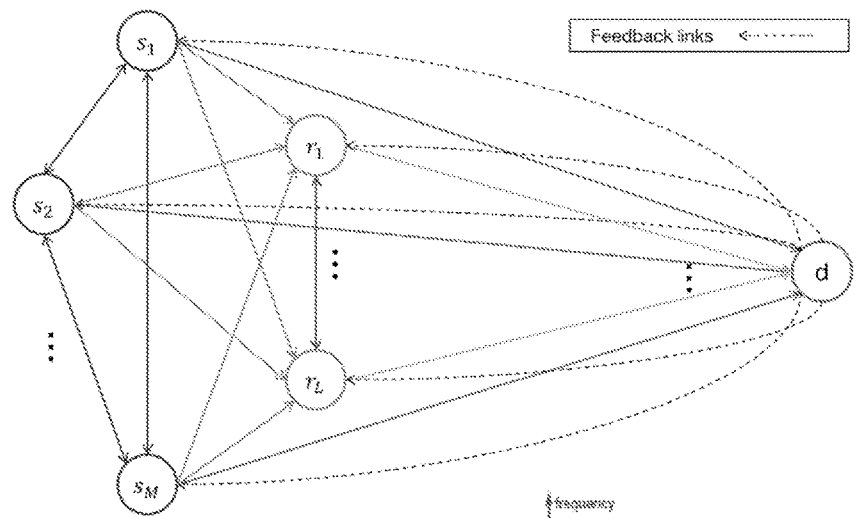
FIG. 1 is a diagram of an example of an OMAMRC (Orthogonal Multiple-Access Multiple Relays Channel) system according to the invention.

An OMAMRC system is illustrated in FIG. 1. Such a system comprises M sources that belong to the set of sources $\mathcal{S}=\{1, \ldots, M\}$, L relays that belong to the set of relays $\mathfrak{R}=\{M+1, \ldots, M+L\}$ and a destination d.

Each source of the set $\mathcal{S}$ communicates with the single destination with the assistance of the other sources (user cooperation) an relays that cooperate.

By way of a simplification of the description, the following assumptions are made hereafter with respect to the OMAMRC system:
- the sources, the relays are equipped with a single transmission antenna;
- the sources, the relays, and the destination are equipped with a single reception antenna;
- the sources, the relays, and the destination are perfectly synchronized;
- the sources are statistically independent (there is no correlation between them);
- all the nodes transmit with the same power;
- a CRC code is used that is assumed to be included in the $K_i$ information bits of each source i in order to determine whether or not a message is correctly decoded, $i \in \mathcal{S}$;
- the links between the various nodes experience additive noise and fading. The fading gains are fixed when a frame is transmitted over a maximum duration of $1+T_{max}$ time slots, but can change independently from one frame to another. $T_{max} \geq 1$ is a parameter of the system;
- the instantaneous quality of the direct reception channel/link (CSIR "Channel State Information at Receiver") is available at the destination, the sources and the relays;
- feedback is error-free (no error on the control signals).

The nodes comprise the relays and the sources that can act as a relay when they do not emit their own message.

The nodes, M sources and L relays, access the transmission channel according to a frequency orthogonal multiple-access scheme and operate in accordance with a full-duplex mode that allows them to listen to the transmissions of the other nodes without any interference.

The band of the channel is divided into B sub-bands, the number of which is assumed to be greater than or equal to the number of sources: $B \geq M$. Each sub-band associated with a time slot determines F channel uses (F resource elements).

In the case of a transmission with OFDM modulation, a sub-band can comprise, for example, as many sub-carriers as an OFDM symbol.

The number N of channel uses is assumed to be identical for each transmission slot: $N=B \times F$. A transmission cycle lasts for $1+T_{used}$ time slots, with $T_{used} \leq T_{max}$ and $T_{max}$ being the maximum number of time slots. At each time slot, no sub-band, or one or more sub-band(s) is/are allocated to a node according to a first partition.

During the first time slot (first phase) all the sources transmit, assuming that $B \geq M$, respectively on one or more sub-band(s) allocated to each source.

During the next "retransmission slots" (second phase), only the nodes selected from among the sources and the relays retransmit and their retransmission occurs on the one or more sub-band(s) that are respectively allocated thereto according to a partition determined for each current slot. Thus, the partitions can differ between all the transmission slots, including the first.

The selection of the nodes and the allocation of the sub-bands are implemented by a scheduler, typically hosted by the destination.

The following notations are used:
- if $i \leq M$ the selected node i is a source i denoted $s_i$, $i \in \{1, \ldots, M\}$, otherwise $i > M$ and the selected node is a relay $i-M$ denoted $r_{i-M}$, $i \in \{M+1, \ldots, M+L\}$;
- $a_t \in (\mathcal{S} \cup \mathfrak{R})^B$ is the dimension vector B of the nodes selected for the transmission slot t, whether this is during the first phase or during the second phase. The $i^{th}$ element $a_{t,i}$ of the vector $a_t$ designates the $i^{th}$ sub-band and the active selected node during this time slot t in this sub-band i, $i \in \{1, \ldots, B\}$. The order in the vector corresponds to the order of the sub-bands;
- $n_t \in \{0, \ldots, B\}^{M+L}$ is the dimension vector M+L of the number of sub-bands allocated for each node that varies between 0 (the node is inactive) and B (the node occupies all the sub-bands), source or relay, for the transmission slot (time slot) t, whether this is during the first phase or during the second phase. The $i^{th}$ element $n_{t,i}$ of the vector $n_t$ denotes the number of sub-bands allocated to the node i at the transmission slot (time slot) t, $i \in \{1, \ldots, M+L\}$. The sum of the elements forming the vector $n_t$ is equal to B, the number of sub-bands;
- $h_{a,b}$ is the attenuation gain of the channel (fading) between the node a (source or relay) and the node b (source, relay or destination) that follows a symmetrical circular complex Gaussian distribution with a zero average and variance $\gamma_{a,b}$ the gains are mutually independent;

$T_{used}$ is the minimum number of retransmission time slots, i.e., during the second phase that leads to zero faults for all the sources (the individual cutoff event of each of the sources is zero):

$$T_{used} = \min_{t \leq T_{max}} t \text{ s.t. } \left(\mathcal{O}_{i,t} = 0 \forall i \text{ or } t = T_{max}\right) \quad (1)$$

The individual cutoff event $\mathcal{O}_{s,t}(a_t, n_t, \mathcal{S}_{a_t, t-1} | h_{dir}, \mathcal{P}_{t-1})$ of the source s after the retransmission slot t (round t) depends on the vector $a_t$ for selecting the nodes, the vector $n_t$ for allocating sub-bands and the set $\mathcal{S}_{a_t, t-1}$ of decoded sources at the end of the preceding slot, t−1.

It is also contingent upon knowledge of the implementations of the channel of the direct links $h_{dir}$ (the gains of the channel), as well as on $\mathcal{P}_{t-1}$. $\mathcal{P}_{t-1}$ designates the set of selection vectors $\hat{a}_l$ (therefore, of selected nodes) and of allocation vectors $\hat{n}_l$ with their associated set of decoded sources $\mathcal{S}_{\hat{a}_l, l-1}$ determined for the slots (rounds) l preceding the slot t, $l \in \{1, \ldots, t-1\}$ and the set $\mathcal{S}_{d, t-1}$ of sources decoded by the destination. It should be noted that $a_0$ is the selection vector of the source nodes transmitting during the transmission phase, that $n_0$ is the allocation vector of sub-bands allocated for each source during the transmission phase and that $\mathcal{S}_{d,0}$ is the set of sources decoded by the destination on completion of the first phase.

The common cutoff event $\mathcal{E}_{t,\mathcal{B}}(a_t, n_t, \mathcal{S}_{a_t, t-1} | h_{dir}, \mathcal{P}_{t-1})$ for the sub-set of sources $\mathcal{B}$ after the time slot t (round t) is the event whereby at least one source of the sub-set $\mathcal{B}$ is not correctly decoded by the destination at the end of this slot t. Subsequently, the dependencies of $S_{d,t-1}$ with $h_{dir}$ and with $\mathcal{P}_{t-1}$ are omitted in order to simplify the notations. $\overline{S}_{d,t} = S \setminus S_{d,t}$ denotes the set of sources not successfully decoded by the destination at the end of the time slot t (round t).

From an analytical perspective, the common cutoff event of a sub-set $\mathcal{B}$ of sources occurs, i.e., is met, if the vector of the rates of these sources is not included in the corresponding capacity region MAC.

Thus, for a given sub-set of sources $\mathcal{B} \subseteq \overline{S}_{d,t-1}$, for a candidate vector $a_t$ of selected nodes and the corresponding sub-band allocation vector $n_t$, this event can be expressed in the following form:

$$\mathcal{E}_{t,\mathcal{B}}(a_t, n_t, S_{a_t,t-1}) = \bigcup_{\mathcal{U} \subseteq \mathcal{B}} \mathcal{F}_{d,\mathcal{B}}(\mathcal{U}), \quad (2)$$

where $\mathcal{F}_{d,\mathcal{B}}(\mathcal{U})$ expresses the non-compliance of the inequality MAC associated with the sum rate of the sources contained in $\mathcal{U}$:

$$\mathcal{F}_{d,\mathcal{B}}(\mathcal{U}) = [\sum_{s \in \mathcal{U}} R_s n_{0,s} > \sum_{s \in \mathcal{U}} \overline{I}_{0,s} + \sum_{l=1}^{t-1} \sum_{i=1}^{M+L} \overline{I}_{l,i}[\mathcal{C}_{l,i}] + \sum_{i=1}^{M+L} \overline{I}_{t,i}[\mathcal{C}_{t,i}]] \quad (3)$$

with:
- l being the time slot index (round) of the second phase with the convention that l=0 corresponds to the end of the first phase (transmission phase), $l \in \{1, \ldots, T_{used}\}$;
- s being the index corresponding to the source node, $s \in \{1, \ldots, M\}$;
- i being the index corresponding to any node (source and relay), $i \in \{1, \ldots, M+L\}$;
- $n_{l,i}$ being the number of sub-bands allocated to the node i for the time slot l (round) $l \in \{1, \ldots, T_{used}\}$;
- $n_{0,s}$ being the number of sub-bands allocated to the source $s \in \{1, \ldots, M\}$ by the destination for the first phase;

$$\mathcal{C}_{l,i} = [[S_{i,l-1} \cap \mathcal{U} \neq \emptyset] \wedge [S_{i,l-1} \cap \mathcal{J} = \emptyset]] \quad (4)$$

with $\mathcal{J} = \overline{S}_{d,t-1} \setminus \mathcal{B}$, representing the set of interfering sources, $\mathcal{C}_{l,i}$ equals one if, on the one hand, the intersection between the set of sources correctly decoded by the node i at the slot l−1 and the set $\mathcal{U}$ is not empty and, on the other hand, the intersection between the set of sources correctly decoded by the node i at the slot l−1 and the set of interfering sources is empty;
- $\wedge$ represents the "and" logic;
- [P] represents the Iverson brackets, i.e., that yield the value 1 if the event P is met and the value 0 if not;
- $\overline{I}_{i,l}$ being the block of mutual fading information of the node i at the destination d for the sub-bands $n_{l,i}$ allocated to the node i at the time slot $l \in \{1, \ldots, T_{used}\}$:

$$\overline{I}_{l,i} = \sum_{f=1}^{B} I_{a_{l,f},d}[i = a_{l,f}] \quad (5)$$

where $I_{a_{l,f},d}$ is the mutual information between the node $a_{l,f}$ to which the sub-band f is allocated at the time slot (round) $l \in \{1, \ldots, T_{used}\}$ and the destination d. The mutual information depends on the power transmitted on the sub-band of the channel, i.e., $$\frac{P_T}{n_{l,a_{l,f}}}$$

between the node $a_{l,f}$ and the destination d, with $P_T$ being the total power of this node. If the node i is not selected at the time slot l, then the mutual information block $\overline{I}_{l,i}$ is zero;

$I_{0,s}$ being the block of mutual fading information of the source s at the destination d, for given $a_0$ and $n_0$, at the time slot corresponding to the transmission phase (first phase);

$R_s = K_s/(n_{0,s}F)$, $s=1, \ldots, M$ is the rate used during the first phase, with $K_s$ being the number of useful information bits transmitted on $n_{0,s}F$ channel uses.

Subsequently, the cutoff event for a given source s is defined in the following form:

$$\mathcal{O}_{s,t}(a_t, n_t, S_{a_t,t-1}) = \bigcap_{\mathcal{J} \subset \overline{S}_{d,t-1}, \mathcal{B} = \mathcal{J}, s \in \mathcal{B}} \mathcal{E}_{t,\mathcal{B}}(a_t, n_t, S_{a_t,t-1})$$

which by definition is the intersection of all the common cutoff events corresponding to a set of sources $\mathcal{B}$ including the source s. A source s is cutoff if, and only if, there is no set of sources $\mathcal{B}$ including it that can be associated with error-free decoding, i.e., $\mathcal{E}_{t,\mathcal{B}} = 0$. It becomes:

$$\mathcal{O}_{s,t}(a_t, n_t, S_{a_t,t-1}) = $$
$$\bigcap_{\mathcal{J} \subset \overline{S}_{d,t-1}} \bigcup_{\mathcal{U} \subseteq \mathcal{J}, s \in \mathcal{J}} \left\{ \sum_{i \in \mathcal{U}} R_i n_{0,i} > \sum_{i \in \mathcal{U}} \overline{I}_{0,i} + \sum_{l=1}^{t-1} \sum_{i=1}^{M+L} \overline{I}_{l,i} 1_{\{C_{l,i}\}} + \sum_{i=1}^{M+L} \overline{I}_{t,i} 1_{\{C_{t,i}\}} \right\}.$$

This cutoff event indicates whether a source is decoded without error ($\mathcal{O}_{s,t}=0$) or if it is cutoff ($\mathcal{O}_{s,t}=1$). This approach allows the result of the implementation of a parity check (CRC check) to be predicted without proceeding with the simulation of the whole of the transmission (modulation coding) and reception (detection/demodulation, decoding) chain. In this way, it defines an abstraction of the physical layer. Some adjustments obtained by simulation (called calibration within the context of abstractions of the physical layer) for a given coding scheme can be carried out by introducing weighting parameters of the mutual information and/or of the SNR of the links.

The two transmission phases of the transmission method can be preceded by an initial phase of determining an initial rate. This phase can occur once every several hundred frames (i.e., each time the quality statistics of the channel/link change) in the case of slow fading, this is referred to as slow link adaptation. Alternatively, this phase can occur much more frequently and at most at each cycle, this is referred to as fast link adaptation. Whether the link adaptation is fast or slow, the rate of each source and the allocation of sub-bands are known before the start of the transmission.

By exploiting reference signals (pilot symbols of the 3GPP LTE/NR DMRS type, reference signals of the 3GPP LTE/NR SRS type, etc.), the destination can determine the gains (CSI "Channel State Information") of the direct links: $h_{dir} = \{h_{s_1,d}, \ldots, h_{s_M,d}, h_{r_1,d}, \ldots, h_{r_L,d}\}$, i.e., source links to destination and relay to destination. The destination can therefore deduce average values therefrom for the direct links within the context of slow adaptation.

By contrast, the gains of the links between sources, of the links between relays and of the links between sources and relays are not known to the destination. Only the sources and the relays can estimate a metric of these links by exploiting reference signals in a manner similar to that used for the direct links.

Given that within the context of slow adaptation, the statistics of the channels are assumed to be constant between two initialization phases, transmitting metrics to the destination by the sources and the relays can only occur at the same rate as the initialization phase. The statistic of the channel of each link is assumed to follow a centered circular complex Gaussian distribution and the statistics are independent between the links.

Within the scope of fast adaptation, optimizing the spectral efficiency can be based on knowledge of all the links or of some links. One possible, but very onerous solution in terms of control, is that the sources and the relays feed back the coefficients of the links (quantified per sub-band) that they can estimate to the destination.

During the initial link adaptation phase that precedes the transmission of one or more frame(s), the destination transmits, for each source s, a representative value (index, MCS, rate, etc.) of an initial rate $\overline{R}_i$. Each of the initial rates unambiguously determines an initial modulation and coding scheme (MCS) or, conversely, each initial MCS determines an initial rate. The initial rates $\overline{R}_i$ are fed back via control channels with a very limited rate.

These initial rates are determined by the destination so as to maximize a quality of service metric, for example, an average spectral efficiency.

In the case of slow link adaptation, the quality of service metric is, according to one embodiment, an average spectral efficiency, which is expressed in the following form:

$$\eta^{sla} = \frac{1}{B}\sum_{k=1}^{M} \frac{R_i n_{0,i}}{1 + \mathbb{E}(T_{used})}(1 - BLER_i), \quad (6)$$

with:

$$R_i = \frac{K_i}{n_{0,i} \times F}$$

being a variable representing the initial rate allocated to the source i, i∈{1, . . . , M};
$K_i$ being the amount of data transmitted on $n_{0,i} \times F$ channel uses by the source i;
$T_{used}$ being number of time slots used for the cooperative or non-cooperative retransmissions;
$\mathbb{E}(T_{used})$ being an average of the number of time slots used for the retransmissions, whether they are cooperative or non-cooperative;
$BLER_i$ being the average block error rate for the source i.

In the case of slow link adaptation, the rate and the allocation of sub-bands per source remains unchanged for several hundred transmissions of messages from the sources, which allows the block error rate (BLER) of the source i to be averaged on the statistics of the channel (CDI "Channel Distribution Information") known to the destination. A source i takes $n_{0,i} \times F$ resource elements in order to transmit the data $K_i$ at the rate $R_i$ during the time slot of the first phase.

In the case of fast link adaptation, the quality of service metric is, according to one embodiment, an average utility function subject to the individual cutoffs of the sources defined per transmitted message and the rate and the allocation of sub-bands can change from one message to the next:

$$\eta^{fla} = \frac{1}{B}\sum_{k=1}^{M} \frac{R_i n_{0,i}}{1 + T_{used}}(1 - O_{i,T_{used}}) \quad (7)$$

with:
$O_{i,t}$ being the individual cutoff event of the source i at the retransmission slot t, which equals one in the event of a fault or zero in the event of success (correctly decoded source),
$O_{i,0}$ is the individual cutoff event at the end of the transmission phase (first phase of a time slot);
$T_{used}$ being the number of time slots used for cooperative or non-cooperative retransmissions (the second phase can assume the value 0 if $O_{i,0}=0 \forall i \in \mathcal{S}$);

$$R_i = \frac{K_i}{n_{0,i} \times F}$$

being a variable representing the initial rate allocated to the source i, i∈{1, . . . , M}.

Figure 2:
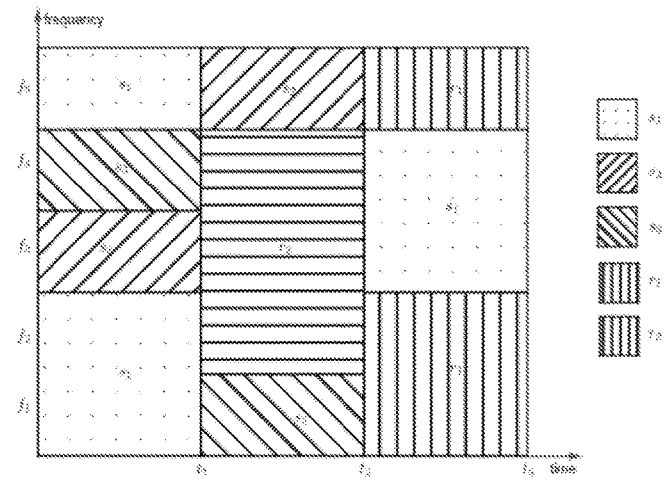
FIG. 2 is a diagram of a transmission cycle of a frame according to one embodiment of the invention.

One embodiment of a transmission method according to the invention is described with reference to the diagram of FIG. 2, which illustrates a transmission cycle of a frame within the context of a three-source OMAMRC system, i=(1, 2, 3) two relays, i=(4, 5), a destination and a transmission channel with a certain bandwidth. The band is split into B=5 sub-bands and each sub-band associated with a time slot determines F=5 channel uses, that is, N=25.

During the first phase of a time slot, each source i={1, 2, 3} emits its code words. According to the example, the number of sub-bands allocated to a source differs between the sources. Thus, the sub-bands $f_1, f_2$ and $f_5$ are allocated to the source 1, the sub-band $f_3$ is allocated to the source 2 and the sub-band $f_4$ is allocated to the source 3. The selection vector is therefore $a_0=[s_1,s_1,s_2,s_3,s_1]T=[1,1,2,3,1]^T$. The vector for allocating sub-bands per node is therefore $n_0=[3,1,1,0,0]^T$.

During the second phase, called retransmission phase, and for the first time slot, only the sources 2, 3 and the relay 2 are selected and the sub-band $f_1$ is allocated to the source 3, the sub-bands $f_2, f_3$ and $f_4$ are allocated to the relay 5 and the sub-band $f_5$ is allocated to the source 2. The selection vector is therefore $a_1=[s_3,r_2,r_2,r_2,s_2]^T=[3,5,5,5,2]^T$. The vector for allocating sub-bands per node is therefore $n_1=[0,1,1,0,3]^T$.

During the second phase, called retransmission phase, and for the second time slot, only the source 1 and the relay 4 are selected and the sub-bands $f_1$, $f_2$ and $f_5$ are allocated to the relay 4, the sub-bands $f_3$ and $f_4$ are allocated to the source 1. The selection vector is therefore $a_2=[r_1,r_1,s_1,s_1,r_1]^T=[4,4,1,1,4]^T$. The vector for allocating sub-bands per node is therefore $n_2=[2,0,0,3,0]^T$.

Figure 3:
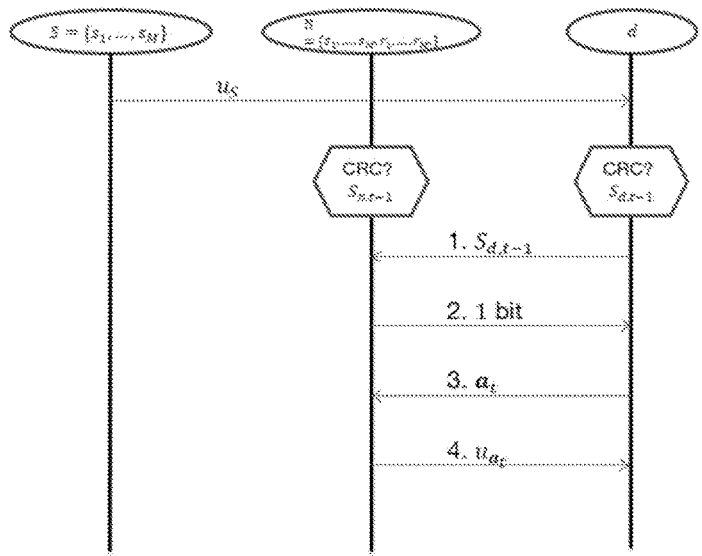
FIG. 3 is a diagram of the protocol of the exchanges of information between the destination and the nodes, sources and relays, according to one embodiment of the invention.

An embodiment of the protocol of the exchanges between the nodes and the destination is illustrated in FIG. 3.

Each source transmits its frame data to the destination with the assistance of the other sources and of the relays. A frame occupies time slots during the transmission of the M messages of the M sources, respectively. The transmission of a frame (which defines a transmission cycle) occurs for $1+T_{used}$ time slots: 1 slot for the $1^{st}$ phase with a channel uses capacity $n_{0,i}$ for each source i, $T_{used}$ slots for the $2^{nd}$ phase with a channel uses capacity $n_{t,i}$ for each source i.

During the first phase, each source s∈ $\mathcal{S}$ transmits, after encoding, a message $u_s$ comprising $K_s$ information bits $u_s\in \mathbb{F}_2^{K_s}$, with $\mathbb{F}_2$ being the two element Galois field. The message $u_s$ comprises a code of the CRC type, which allows the integrity of the message $u_s$ to be checked. The message $u_s$ is coded according to the initial MCS. Given that the initial MCSs can be different between the sources, the lengths of the coded messages can be different between the sources. The coding uses an incremental redundancy code. The code word that is obtained is segmented into redundancy blocks. The incremental redundancy code can be of the systematic type, the information bits are then included in the first block. Whether or not the incremental redundancy code is of the systematic type, it is such that the first block can be decoded independently of the other blocks. The incremental redundancy code can be produced, for example, by means of a finite family of rate compatible punctured linear codes or of rate-free codes modified in order to operate with finite lengths: raptor code (RC), rate compatible punctured turbo code (RCPTC), rate compatible punctured convolutional code (RCPCC), rate compatible low density parity check code (RCLDPC).

Thus, during the first phase, the M sources simultaneously transmit their message during the transmission slot on the allocated sub-hands in accordance with the vector $a_0$, respectively with modulation and coding schemes determined from the values of the initial rates.

Each transmitted message corresponding to a source $s \in S$, a correctly decoded message, is assimilated with the corresponding source for the purposes of notation.

Whether it is during the first phase or the second phase, when a node, in particular a source, transmits, the destination and the other nodes listen. Each full-duplex node can simultaneously transmit and listen to all the other nodes given that, in order to transmit, each node is allocated one or more sub-band(s) that are different between the nodes.

The destination, the sources and the relays attempt to decode the messages received at the end of a time slot. The success of the decoding at each node is determined using the CRC. The destination and the nodes thus determine their set of correctly decoded sources.

During the second phase, at the time lot (round) t, the destination d transmits its set of correctly decoded sources at the end of the preceding time slot $S_{d,t-1}$ by using, for example, a feedback broadcast control channel t={1, . . . , $T_{used}$}. This feedback can be made up of a vector of M bits. If the decoding of all the sources by the destination is correct, $S_{d,t-i}$=S. In this case, the current cycle is stopped, a new cycle can start. A cycle for transmitting a new frame begins with deleting the memories of the relays and of the destination and with the transmission of new messages by the sources. The number of time slots (rounds) used during the second phase $T_{used}$={1, . . . , $T_{max}$} depends on the success of decoding at the destination.

The nodes, sources and relays compare the set $S_{d,t-1}$ with their set of correctly decoded sources.

If the set of a node comprises at least one source not included in the set $S_{d,t-1}$ of the destination, the node notifies the destination accordingly by using, for example, a dedicated control channel of the unicast type. The information transmitted by a node can be made up of its set of correctly decoded sources or, as illustrated in FIG. 3, a bit, for example, set to one.

During this second phase, the destination follows a certain strategy in order to determine the one or more selected node(s) that transmit at the time slot (round) t.

The destination notifies the nodes of this selection by transmitting the vector $a_t$ using, for example, the feedback broadcast control channel.

Each node that receives the vector $a_t$ can determine whether it is selected and on which sub-band it is to transmit.

During this second phase, and for at least one retransmission slot from among the $T_{used}$ retransmission slots, at least one selected node, source or relay generates a cooperative retransmission. Outside the at least one time slot, the retransmissions can be cooperative or non-cooperative.

The node selected for a retransmission transmits $u_{a_t}$, after multi-user coding, the words or some of the words that it has correctly decoded. The selected node can transmit parities determined on the basis of the messages of its set of correctly decoded sources using network coding and Joint Network Channel Coding. The other nodes and the destination can improve their own decoding by exploiting the transmission of the selected node and can consequently update their set of correctly decoded sources.

The destination thus controls the transmission of the nodes using a feedback channel. This allows the spectral efficiency and the reliability to be improved by increasing the probability of decoding all the sources by the destination.

Selection Strategy

According to a first strategy, the destination selects those that maximize the sum of the mutual information from among the set Zt of the various allocations of sub-bands to the nodes that can assist at the slot t. This strategy only requires knowledge of the nodes that can assist, it is compatible with the mode in which the nodes transmit information in the form of a bit.

The selection criterion can be expressed in the following form:

$$\hat{a}_t = \mathrm{argmax}_{a_t \in Z_t} \{\Sigma_{i=1}^{M+L} \overline{I}_{t,i}\} \quad (8)$$

with $Z_t$ being the set of possible vectors $a_t$ that correspond to the selection of the nodes that can assist the destination at the slot (round) t.

On the basis of the sets of correctly decoded sources received from the nodes and according to a second strategy, the destination selects the nodes that allow as many newly correctly decoded sources as possible to be obtained at the destination at the end of the current slot t, i.e., which maximize the cardinality of the set of sources correctly decoded by the destination at the end of the current slot t.

According to this strategy, the method reviews all the possible values of the vector $a_t$ and retains that which leads to the greatest number of newly decoded sources. Thus, the method does not take into account the nodes that cannot assist the sources not yet decoded, since it targets the greatest number of newly decoded sources, i.e., the only nodes i that are considered are those that meet: $\overline{S}_{d,t-1} \cap S_{a_{t,i},t-1} \neq \emptyset$ for i∈{1, . . . , M+L}.

This strategy also requires knowledge of the set of correctly decoded sources of all the previously selected nodes.

In the case whereby several vectors $a_t$ can lead to the same maximum number of newly decoded sources, the method selects the vector $\hat{a}_t$ that maximizes the sum $\Sigma_{i=1}^{M+L} \overline{I}_{t,i}$ of the mutual information. Indeed, at a time slot t, this is the only element that can be maximized in order to maximize the straight part of the individual cutoff events and common cutoff events. The presence of $C_{t,i}$ in the expression of the common cutoff event expresses the fact that the only nodes that can be selected are those that can assist, i.e., have decoded at least one source not yet decoded by the destination. The selection criterion then can be expressed in the following form:

$$\hat{a}_t = \mathrm{argmax}_{a_t \in \dot{A}_t} \{\Sigma_{i=1}^{M+L} \overline{I}_{t,i}\} \quad (9)$$

with $\dot{A}_t$ being the set of candidate nodes that maximize the set of the destination at the end of the slot (round) t.

It should be noted that for t=0, the only candidate nodes for the first phase are the sources, their decoding set corresponds to itself and the relay nodes have an empty decoding set.

The invention claimed is:

1. A transmission method for comprising:
   transmitting frame messages intended for a telecommunication system with a transmission channel, M sources $s_i$ i∈{1, ..., M}, optionally L relays ($r_1$, ..., $r_L$) and a destination (d), M≥2, L≥0, M≤B and orthogonal multiple-access to the transmission channel, wherein the transmitting is of a frequency-division multiplexing (FDM) type on a band divided into B mutually orthogonal sub-bands, and wherein the transmitting comprises:
   simultaneous transmission of the M sources during a time slot with allocation of at least one sub-band per source; and
   at least one cooperative retransmission of a time slot of at least one relay node taken from among the M sources and the L relays selected by the destination, with allocation by the destination of at least one sub-band per selected node, by knowing the sources correctly decoded by the nodes the destination selects the nodes that allow as many newly correctly decoded sources as possible to be obtained at the destination on completion of the cooperative retransmission.

2. The transmission method as claimed in claim 1, wherein the selection by the destination is such that a relay node that decodes a set of sources at a time slot t can only cooperate at a time slot t+1 for a single source of its set.

3. The transmission method as claimed in claim 1, wherein:
   the destination broadcasts its set of correctly decoded sources from among the received sources to the relay nodes during a transmission slot;
   the relay nodes that have correctly decoded a source not correctly decoded by the destination notify the destination as such;
   the destination broadcasts a vector to the relay nodes comprising the relay nodes selected for the sub-bands for cooperative or non-cooperative retransmission during the next transmission slot.

4. The transmission method as claimed in claim 3, wherein a relay node notifies the destination by transmitting its set of correctly decoded sources.

5. The transmission method as claimed in claim 1, wherein the destination selects the relay nodes such that the sum of the mutual information between the nodes that can assist with their allocated sub-bands and the destination is maximized.

6. The transmission method as claimed claim 1, further comprising an initial phase of determining initial rates and such that the initial rates allocated to the sources are determined in order to maximize a metric expressed in the form of an average utility function subject to an average individual BLER for each source:

$$\eta^{sla} = \frac{1}{B}\sum_{i=1}^{M} \frac{R_i n_{0,i}}{1 + \mathbb{E}(T_{used})}(1 - BLER_i),$$

$$R_i = \frac{K_i}{n_{0,i} \times F}$$

being a variable representing the initial rate allocated to the source i, i ∈ {1, ..., M};
   $K_i$ being the amount of data transmitted on $n_{0,i} \times F$ channel uses by the source i;
   $T_{used}$ being the number of time slots used for cooperative or non-cooperative retransmissions;
   $\mathbb{E}(T_{used})$ being an average of the number of time slots used for the cooperative or non-cooperative retransmissions;
   $BLER_i$ being the block error rate for the source i.

7. The transmission method as claimed in claim 1, further comprising an initial phase of determining initial rates at each frame and such that the initial rates allocated to the sources are determined in order to maximize a metric expressed in the form of an average utility function subject to individual cutoffs of the sources:

$$\eta^{fla} = \frac{1}{B}\sum_{i=1}^{M} \frac{R_i n_{0,i}}{1 + T_{used}}(1 - \mathcal{O}_{i,T_{used}}),$$

with:
   $\mathcal{O}_{i,t}$ being the individual cutoff probability of the source i at the cooperative or non-cooperative retransmission slot t;
   $T_{used}$ being the number of cooperative or non-cooperative retransmissions;

$$R_i = \frac{K_i}{n_{0,i} \times F}$$

being a variable representing the initial rate allocated to the source i, i ∈ {1, ..., M};
   $n_{0,i}$ being a number of sub-bands allocated to the node i for the time slot 0, i ∈ {1, ..., M};
   F being a number of channel uses.

8. A telecommunication system comprising:
   M sources ($s_1$, ..., $s_M$),
   L relays ($r_1$, ..., $r_L$); and
   a destination (d), M>2, L≥0,
   wherein the M sources each comprise a processor configured to transmit frame messages intended for the telecommunication system with a transmission channel and orthogonal multiple-access to the transmission channel, wherein the transmitting is of a frequency-division multiplexing (FDM) type on a band divided into B mutually orthogonal sub-bands, and wherein the transmitting comprises:
   simultaneous transmission of the M sources during a time slot with allocation of at least one sub-band per source; and
   at least one cooperative retransmission of a time slot of at least one relay node taken from among the M sources and the L relays selected by the destination, with allocation by the destination of at least one sub-band per selected node, by knowing the sources correctly decoded by the nodes the destination selects the nodes that allow as many newly correctly decoded sources as possible to be obtained at the destination on completion of the cooperative retransmission.

* * * * *